April 9, 1940.         L. SLOAN         2,196,841
FLEXIBLE COUPLING
Filed Feb. 5, 1937         2 Sheets-Sheet 1

Inventor:
Lon Sloan.
By Mason, Jackson, Boettcher & Denner
Attys.

April 9, 1940. L. SLOAN 2,196,841
FLEXIBLE COUPLING
Filed Feb. 5, 1937 2 Sheets-Sheet 2
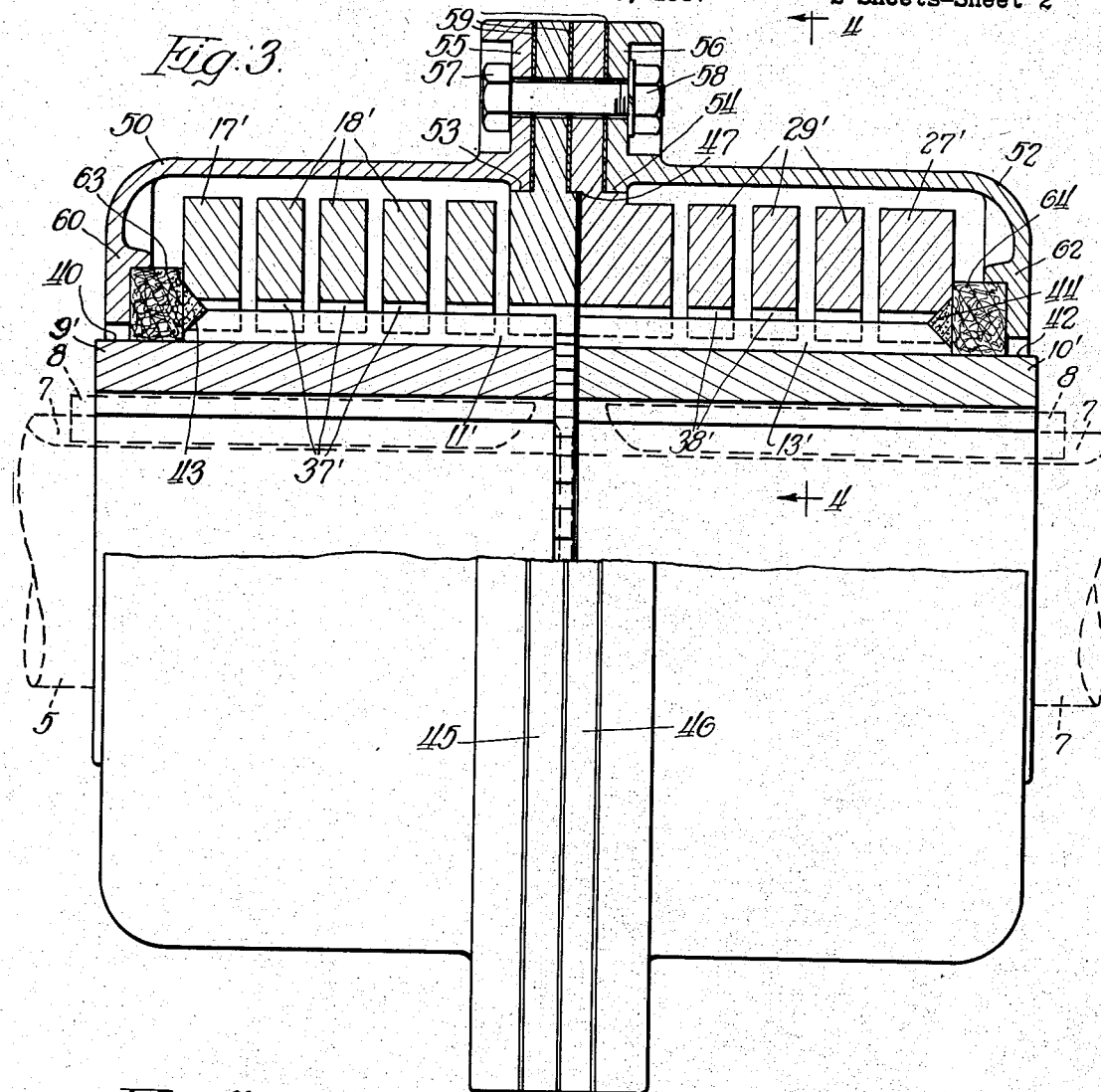
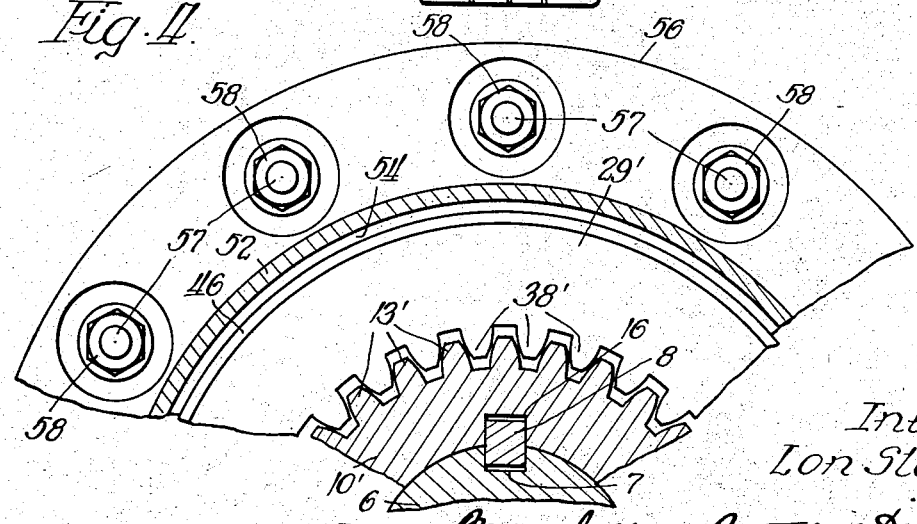
Inventor
Lon Sloan.

Patented Apr. 9, 1940

2,196,841

UNITED STATES PATENT OFFICE 2,196,841

FLEXIBLE COUPLING

Lon Sloan, Chicago, Ill.

Application February 5, 1937, Serial No. 124,181

17 Claims. (Cl. 64—15)

This invention relates to flexible couplings, and more particularly is directed to flexible couplings for transmitting torque from a driving member to a driven member, wherein any misalignment between the members is accommodated by distortion within the coupling.

It is well known in the art that, to avoid bending stresses in shafting and consequent excessive pressure on the bearings, special coupling members must be provided. In the majority of couplings with which I am familiar, the distortion is accommodated by parts which are inherently flexible, such as rubber, leather, thin steel discs or springs.

The present invention contemplates a design of flexible coupling possessing the essential requirements of protecting both the shaft and its bearings from injury due to misalignment, and also being a more or less permanent part of the torque transmission system, so that it is unnecessary to repair or replace the coupling or parts thereof.

One object of the present invention is to provide a coupling of sturdy mechanical design, capable of transmitting torque from a driving to a driven shaft throughout the life of the shafting, and so constructed as to accommodate within itself all stresses caused by angular or offset parallel misalignment or both.

Another object of the present invention is to produce a coupling of simplified design, capable of easy assembly and disconnection, and formed of component elements which can be easily machined and fitted into an operative structure.

The present construction departs from the operating principles of previous couplings of this type with which I am familiar in that I employ a pair of interconnected members having meshing engagement with splined sleeves on the driving and driven shafts, the members being angularly rockable upon angular misalignment of the shafts and having relative radial displacement when connected to parallel misaligned shafts.

In the preferred embodiment of the invention, I provide sleeve members keyed to the respective shafts and having splined external surfaces. To these sleeve members, I secure flexible helical spring members which have internal tooth portions engaging in the splines of the respective sleeves and having flange interconnection between the shafts. The tooth portions on the spring members are so designed as to have slight clearance at the pitch circle, whereby upon parallel misalignment of the shafts the two spring sections have relative radial movement to accommodate this misalignment without transmitting any bending stresses to the shafts or bearings.

The coupling as disclosed in the phesent invention is in dynamic balance, thus introducing no additional stresses at high speed rotation of the shafts, while providing a drive which, in general, is positive, although the spring sections may be under slight torsional stress due to the clearance between the teeth. This produces, in effect, a progressive torsional spring effect to reduce the shock of starting heavy loads. Preferably, the coil sections are so assembled that one is being wound as the other tends to unwind under torque. This has a tendency to balance the stresses in the coil sections.

As a further feature of the present invention, I may enclose the coupling in an oil-tight housing, whereby a quiet, smooth running and long wearing coupling is produced, which, however, retains all the advantages inherent in the present invention.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 3 is an elevational view similar to Figure 1, the coupling being provided with an oil-tight housing; and Figure 4 is a sectional view taken on line 4—4 of Figure 3.

Figure 1:
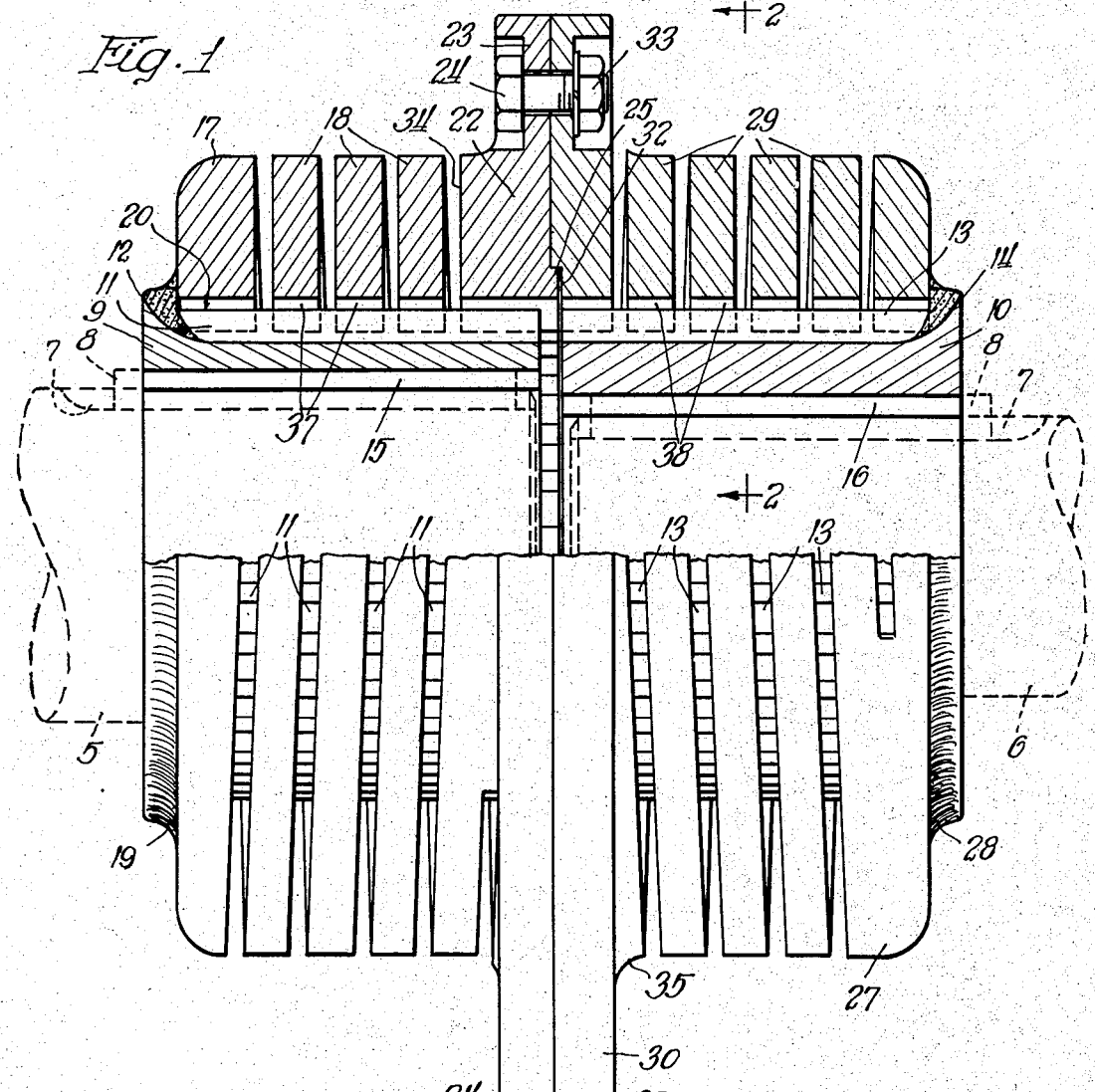
Figure 1 is an elevational view, partly in section, of the coupling of the present invention.
Figure 2:
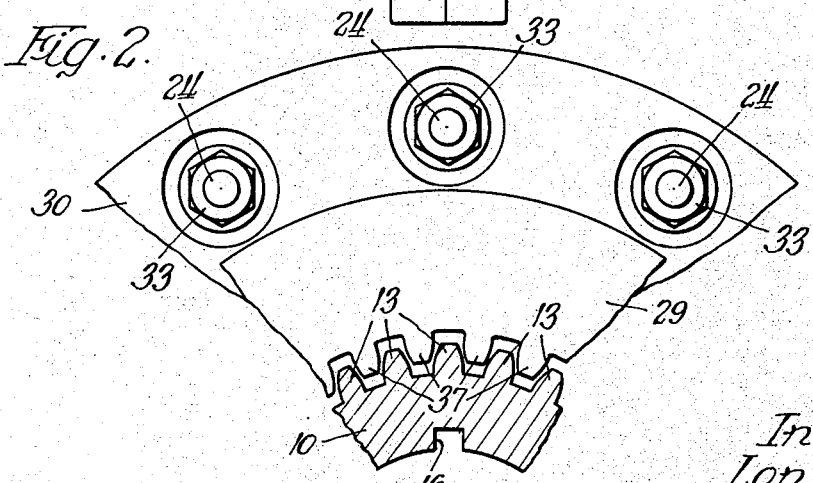
Figure 2 is a sectional view, taken substantially on line 2—2 of Figure 1.

Referring now in detail to Figures 1 and 2 of the drawings, the driving shaft is diagrammatically indicated at 5, while the driven shaft is shown at 6. Each of these shafts is provided with a keyway 7 adapted to receive the key member 8 for locking thereto the respective sleeve members 9 and 10 which form hub members rigidly keyed for conjoint rotation with the shafts 5 and 6. The member 9 is axially broached, as shown in Figure 1, to provide a plurality of axially extending splined portions or clutch tooth portions 11, these splines terminating short of the end of the member 9 to form a radial flange portion 12.

In a similar manner the member 10 is broached axially to form a plurality of radially extending splines or clutch teeth 13 which terminate short of the end of the member 10 to form the radially extending projection 14. The sleeve members 9 and 10 are each provided with keyway slots 15 and 16, respectively, which are adapted to receive the key members 8 when the sleeve members are assembled upon the shafts 5 and 6.

Rigidly secured to the radial projecting portion 12 of the sleeve member 9 is a coupling head 17 which preferably is formed of a relatively resilient metal, such as an electric steel casting where a torch is used to cut the coils, and which is so formed as to provide a helical spring section indicated by the coils 18 encircling the sleeve member 9. The end of the member 17 is welded, as indicated at 19, to form the rigid connection between this end and the projecting portion 12 of the sleeve member 9, and the internal surface of the end portion of the member 17 is splined out, as indicated at 20, to fit about the external surface of the splines 11 of the member 9.

The helical coils 18 of the coupling head 17 terminate in a thickened flange portion 22 which projects radially outwardly to form a coupling flange 23 apertured to receive a plurality of securing bolts 24 extending therethrough. The end section 22 of the head 17 is also provided with an aligning shoulder portion 25, for a purpose to be hereinafter described. In the case of smaller size couplings it may be expedient to omit the internal clutch teeth or splines in the portion 22 of member 17.

A similar coupling head 27 is rigidly secured at its outer end portion to the projecting portion 14 of the coupling member 10 by means of an annular weld indicated at 28. The coupling head 27 is also formed to provide a helical spring section indicated by the helical coils 29 encircling the sleeve member 10. The inner end of this helical coil terminates in the radial flange portion 30 which is also suitably apertured to receive the opposite ends of the bolts 24 and provided with a recessed portion 32 adapted to be piloted upon the shoulder 25 whereby the flanges 22 and 30 may be placed in alignment and rigidly coupled together by the nuts 33 threading over the projecting ends of the bolts 24 to draw the adjacent radial faces of the flanges 22 and 30 into contacting engagement. The internal clutch teeth or splines in the flange 30 may also be omitted if desired.

It will be noted that the upper portion of the coupling head 17, as shown in Figure 1, is thickened, as indicated by the reference numeral 34, due to the fact that the helical coils 18 merge into the flange in such manner as to produce the thickened portion 34. A similar thickened portion is indicated at 35 adjacent the flange 30 of the coupling head 27. In order to produce dynamic balance of the coupling member so that no additional stresses are produced upon high speed rotation of the shafts, I preferably align the coupling heads 17 and 27 so that the thickened portions 34 and 35 of the abutting flanges 22 and 30 thereof are positioned at diametrically opposed points, whereby the two heads are maintained in dynamic balance so that no undue centrifugal force is produced upon rotation thereof.

The internal peripheries of the coils 18 and 29 of the coupling heads 17 and 27, respectively, are formed with internal clutch tooth portions or splines indicated at 37 and 38, respectively. These portions are adapted to have engagement with the splined portions 11 and 13 of the sleeve members 9 and 10, respectively, but are so designed that a clearance sufficient to accommodate slight misalignment is provided at the pitch circle thereof, whereby the coils 18 and 29 may have relative radial movement with respect to the splined portions 11 and 13, producing in effect an internal clutch or spline driving engagement whenever the axes of the shafts 5 and 6 remain parallel but become offset to produce any misalignment between the shafts.

For example, considering that the shafts 5 and 6 remain parallel but offset, and thereby misaligned, with the shaft 6 disposed slightly below the shaft 5, it will be apparent that the coupling head 27 will be held in torque transmitting relation with respect to head 17 due to the engagement between the flanges 22 and 30. Under such circumstances, the lower half of the circumference of the member 10, including the lower splines 13, will move radially in toward the internal splines or clutch teeth 38 at the lower half of the coils 29 whereby, upon rotation of the shafts, the teeth 38, as they pass below the center line of the assembly, will move radially inwardly relative to the splines 13, remaining in this position for substantially 180 degrees of rotation, whereupon they move radially outwardly during the upper half of the rotating cycle. However, the torque causes circumferential movement of the coils so that the clutching engagement is of course maintained throughout rotative movement. Similarly, with respect to the coupling head 17, the teeth 37 will be moved into engagement with the splines 11 as they move around the upper half of the arc, and will move out of engagement with the splines during the lower half of the arc. Thus an internal clutch effect is provided, the splines 11 moving inwardly with respect to the teeth 37 during the upper half of the arc of rotation, while the splines 13 move inwardly with respect to the teeth 38 during the lower half of the rotation of the coils 29.

Due to this relative radial movement, which is predetermined in accordance with the extent of permissible misalignment of the shafts, the coupling accommodates all the distortion and retains within itself the bending stresses produced due to such misalignment, the resiliency of the coils 18 and 29, as well as the relative radial movement of these coils, allowing the rotation of the shafts 5 and 6 in such a misaligned position without producing any bending stresses upon the shafts or bearings.

Considering now a condition of alignment wherein the axis of the shaft 5 is disposed at a slight angle with respect to the axis of the shaft 6, it will be apparent that the coupling, comprising the coupling heads 17 and 27, will accommodate the stresses produced by such misalignment due to the resiliency of the helically coiled sections 18 and 29, the coils 18 moving toward and away from each other in an axial direction during the rotative arc, whereby the teeth 37 thereof rock angularly with respect to the splines 11 during the rotative movement. A similar rocking action is produced between the teeth 38 and the splines 13. However, due to the flexing of the head from a compressed position at one-half of the arc—that is, the coils 18 and 29 being axially compressed toward each other—to a tensioned condition in the other half of the arc, with the coils 18 and 29 under stress tending to separate the same, it will be apparent that the coupling heads themselves absorb all of the stresses due to such misalignment, and no bending stresses are produced upon the associated shafts and bearings. The rocking action of the teeth can be readily accommodated due to the clearance therebetween and also due to the fact that the teeth do not extend to the bottom of the root circle of the splines, and consequently are free to rock in planes at right angles to the longitudinal extent of the splines 11 and 13.

Due to the fact that the heads 17 and 27 are rigidly secured to the sleeve members 9 and 10 by welded portions 19 and 28, respectively, it is apparent that the couplings must have conjoint rotation with the shafts 5 and 6. Further, the coupling heads 17 and 27 being rigidly connected together by the bolts 24, it is obvious that in general a positive drive is provided through the spring coils 18 and 29. However, due to the slight clearance between the teeth and the splines, a slight torsional stress may be set up on the coils 18 and 29 when the shafts are in alignment, thereby reducing shock during starting, although this torsional stress is not sufficient to unduly stress either of the coils 18 or 29, since the splines or clutch teeth 37 and 38, respectively, will move quickly into engagement with the spline surfaces to produce the positive driving engagement between the sleeve members 9 and 10.

In the embodiment of the invention shown in Figures 3 and 4, the sleeve members 9' and 10' are provided with the splined portions 11' and 13', respectively, similar to the manner in which the splines 11 and 13 of Figure 1 are formed. However, the remote ends of the members 9' and 10' are provided with smooth annular surfaces, indicated at 40 and 42, of a diameter equal to or less than the diameter of the root circle of the splines 11' and 13'. The coupling heads 17' and 27' are rigidly secured to the splines 11' and 13' as indicated by the annular welds 43 and 44, and the coils 18' of the head 17' are provided with tooth portions 37' corresponding to the tooth portions 37 of Figure 1, and having the same relative clearance with respect to the splines 11'.

Similarly, the coils 29' of the coupling head 27' are provided with tooth portions 38' having slight relative clearance at the pitch circle with respect to the splines 13'. The end flanges 45 and 46 of the heads 17' and 27' are radially extended, and cooperating shoulders 47 are provided on each of the flanges corresponding to shoulders 25 and 32 of Figure 1. The heads 17' and 27' are so mounted as to maintain the dynamic balance as described in connection with Figure 1.

In order to enclose the coupling heads whereby lubricants or the like may be admitted thereto to lubricate the surfaces between the teeth 37', 38' and the splines 11' and 13', I provide two cup-shaped members 50 and 52, each of which is provided with shoulder portions 53 and 54, respectively, adapted to center the members 50 and 52 with respect to the flanges 45 and 46 of the coupling heads. The members 50 and 52 are provided with radially extending flange portions 55 and 56, adapted to be bolted together by the screw bolts 57 which extend through these flanges and also through the flanges 45 and 46 of the coupling heads. These bolts, together with the nuts 58, rigidly clamp the housing members 50 and 52 to the flanges 45 and 46 of the coupling heads, and suitable gaskets, as indicated at 59, may be interposed therebetween to provide oiltight seals between the housing members 50 and 52 and the flanges 45 and 46.

The opposite ends of the housing members 50 and 52 are provided with inturned flange portions 60 and 62, which are apertured to provide slight radial clearance with respect to the smooth annular surfaces 40 and 42 of the sleeve members 9' and 10'. Suitable packings 63 and 64, which may be of felt or other similar material, are carried by the end flanges 60 and 62 of the housing members, and are pressed against the face portions of the coupling heads 17' and 27' and against the welded rings 43 and 44 through which the coupling heads are secured to the sleeve members. The packings 63 and 64 engage the smooth annular surfaces 40 and 42 of the sleeve members, and consequently prevent any leakage of lubricant outwardly along the sleeve members. If heavy lubricant is employed, the packings may be omitted under certain conditions.

Thus, in effect, the housing members 50 and 52 provide an oil-tight enclosure for the coupling, and also, due to the clearance between the end flanges 60 and 62 and the corresponding sleeve members, relative end play of the shafts is accommodated, the felt packings 63 and 64 accommodating axial end play, while the clearance provides for any angular end play that may be present.

It will be noted from Figure 4 that the key members 8 which couple the shafts 5 and 6 to the sleeve members 9' and 10', respectively, have relatively tight fit along the lateral side walls of the keyways 7 and 16, but have slight radial clearance with respect to the radial walls of the keyways 7 and 16.

The operation of the coupling shown in Figure 3, enclosed within the housing members 50 and 52, is similar to the operation of the coupling described in connection with Figure 1, in that upon parallel misalignment of the shafts 5 and 6, the coils 18' and 29' have relative radial displacement with respect to the splines 11' and 13', moving into meshing engagement therewith during a portion of the arc of rotation and moving out of meshing engagement therewith during the remaining portion of the arc of rotation. Upon angular misalignment of the shafts, the coupling heads 17' and 27' are so flexed that the coils 18' and 29' are placed under axial compression and tension during opposite portions of the rotation thereof, the teeth 37' and 38' in such instances having lateral rocking movement with respect to the splines 11' and 13'.

It is therefore believed apparent that I have provided a novel type of coupling member, having a number of features which are of distinct advantage. It will be obvious that the sleeve members which are keyed to the shafts may be formed by a simple machine operation, the splines 11—11' and 13—13' being axially broached on these members as desired. Similarly, the coupling heads 17—17' and 27—27' may be formed in any suitable manner, either by using an angularly set saw and rotating the coupling heads to form the coils 18—18' and 29—29', using a lathe tool in a similar manner, or forming these coils by the use of a cutting torch to burn a helical cut in the casting forming these members. However, the invention is not to be limited to any particular manner of forming the heads 17—17' and 27—27', since these heads may, if desired, be also formed by rolling up flat strip stock which may be formed either integral or welded, or otherwise suitably secured to the end coils of the sections 18—18' and 29—29'.

If desired, either one of the coupling heads may be used alone at opposite ends of a floating shaft assembly, whereby the weight of the shaft is supported by the coil members to take up any crank or whip action of the shaft. It is to be noted that by reason of the rectangular section of the coils 18—18' and 29—29', the coils provide maximum strength for transmitting torque, but still are resilient in a lateral or axial direction, which is of distinct advantage. By reason of the fact that the coils can provide a large degree of strength for transmitting torque, the coupling may be so constructed that the normal driving torque is transmitted solely through spring torsion and not through contact between the inner and outer splines or teeth 11—11', 13—13', and 37—37', 38—38'. In such case, the contact between these splines or teeth will only occur in the event of parallel or angular misalignment or both, and also during any overload condition either during starting, running at normal speeds or during any braking operation.

I am aware that various changes and modifications may be made in the construction of the present coupling, and intend that the illustrated embodiment thereof serves merely as an illustration of one form of the present invention. I do not intend to be limited except as defined by the scope and spirit of the appended claims.

I claim:

1. In a coupling between driving and driven shafts, means forming external axial splines on the adjacent ends of said shafts, spring coupling means encircling said splines rigidly secured together at adjacent ends and secured to the respective shafts at the opposite ends thereof, and internal tooth portions on said coupling means engaging the splines.

2. In a coupling between driving and driven shafts, means forming external axial splines on the adjacent ends of said shafts, spring coupling means encircling said splines rigidly secured together at adjacent ends and secured to the respective shafts at the opposite ends thereof, and internal tooth portions on said coupling means engaging the splines, said tooth portions having relative radial movement with respect to said splines when said shafts are in parallel offset alignment.

3. In a coupling between driving and driven shafts, means forming external axial splines on the adjacent ends of said shafts, spring coupling means encircling said splines rigidly secured together at adjacent ends and secured to the respective shafts at the opposite ends thereof, and internal tooth portions on said coupling means engaging the splines, said tooth portions having relative rocking movement with respect to said splines when said shafts are in angular misalignment.

4. In a coupling between driving and driven shafts, means forming external axial splines on the adjacent ends of said shafts, spring coupling means encircling said splines rigidly secured together at adjacent ends and secured to the respective shafts at the opposite ends thereof, internal tooth portions on said coupling means engaging the splines, and enclosing housing means for said coupling having means at one end thereof for sealing said housing with respect to the corresponding shaft while permitting end play of said shaft.

5. The combination, with driving and driven shafts, of a coupling comprising sleeve members keyed to the adjacent ends of said shafts and having external splined surfaces, coupling members each rigidly secured at one end thereof to the respective sleeve member and having intermediate helical spring sections terminating at the opposite end thereof in radial flanges, means for rigidly securing said flanges together, and internal teeth formed on said spring sections for engaging said splines.

6. The combination, with driving and driven shafts, of a coupling comprising sleeve members keyed to the adjacent ends of said shafts and having external splined surfaces, coupling members each rigidly secured at one end thereof to the respective sleeve member and having intermediate helical spring sections terminating at the opposite end thereof in radial flanges, means for rigidly securing said flanges together, and internal teeth formed on said spring sections for engaging said splines, said internal teeth having slight clearance with respect to said splines at the pitch circle thereof.

7. A coupling for connecting the adjacent ends of a driving and driven shaft comprising a first sleeve member secured to said driving shaft, a second sleeve member secured to said driven shaft, axially extending external splines on each of said sleeve members, a first coupling member having one end thereof welded to the end of said first sleeve member remote from the end of said driving shaft, a second coupling member having one end thereof secured to the corresponding end of said second sleeve member, said coupling members each having integral helical spring sections encircling said sleeve members and extending toward each other, the adjacent ends of said sections terminating in thickened radial flanges, cooperating annular shoulders on said flanges centering the same, means securing said flanges rigidly together, and internal teeth on said spring sections adapted to engage said splines to transmit torque from said driving shaft to said driven shaft.

8. A coupling for connecting the adjacent ends of a driving and driven shaft comprising a first sleeve member secured to said driving shaft, a second sleeve member secured to said driven shaft, axially extending external splines on each of said sleeve members, a first coupling member having one end thereof welded to the end of said first sleeve member remote from the end of said driving shaft, a second coupling member having one end thereof secured to the corresponding end of said second sleeve member, said coupling members each having integral helical spring sections encircling said sleeve members and extending toward each other, the adjacent ends of said sections terminating in thickened radial flanges, cooperating annular shoulders on said flanges centering the same, means securing said flanges rigidly together, and internal teeth on said spring sections adapted to engage said splines to transmit torque from said driving shaft to said driven shaft, said teeth having relative radial and angular movement with respect to said splines to accommodate misalignment of said shafts.

9. Coupling means for transmitting torque from a driving to a driven shaft comprising means providing axial splines associated with the adjacent ends of said shafts, and interconnected resilient metallic coupling members provided with teeth having engagement with said splines and having predetermined clearance with respect to said splines at the pitch circle thereof.

10. Coupling means for transmitting torque from a driving to a driven shaft comprising means providing external axial splines on the adjacent ends of said shafts, and interconnected coupling members having internally toothed resilient sections encircling said splines and having predetermined clearance with respect to said splines at the pitch circle thereof, said members being rigidly connected at opposite ends to the opposite ends of the spline means.

11. A flexible coupling for transmitting torque between substantially aligned rotary members comprising splines associated with one of said rotary members, a metallic coupling device constructed substantially of helical spring form and having operative connection at one end with the other rotary member, and teeth associated with said coupling device for engaging said splines, said coupling device being capable of transmitting torque between said rotary members independently of engagement between said splines and said teeth.

12. A coupling for transmitting torque from a driving to a driven element comprising two helical spring members connected to said elements at their outer ends and connected together at their inner ends, said two spring members being wound in opposite directions whereby when one of said spring members expands lengthwise under torsion the other contracts lengthwise under torsion.

13. A flexible coupling for transmitting torque between two substantially aligned rotary members comprising two oppositely wound helical springs having their adjacent ends connected together and having their opposite ends connected with said rotary members to transmit torque therebetween, and coacting driving surfaces on said rotary members and on said springs for limiting the torsional deflection of said springs.

14. A flexible coupling for transmitting torque between two substantially aligned rotary members comprising splines associated with one of said rotary members, a metallic coupling device constructed substantially of helical spring form and having operative connection at its opposite ends with said two rotary members, and teeth formed in said coupling device for engaging said splines, said coupling device being capable of transmitting torque between said rotary members independently of engagement between said splines and said teeth.

15. A flexible coupling for transmitting torque between two substantially aligned rotary shafts comprising coiled spring means having one end rigidly anchored in torque transmitting relation to one of said shafts and having its other end rigidly anchored in torque transmitting relation to the other of said shafts, teeth formed in said coiled spring means, and splines carried by one of said shafts and adapted to engage with said teeth intermediate the ends of said coiled spring means, said spring means being capable of transmitting torque between said rotary shafts independently of engagement between said teeth and said splines.

16. In a flexible coupling for transmitting torque between two substantially aligned rotary members, the combination of a helical spring extending substantially axially of said rotary members, means rigidly securing said rotary members to longitudinally separated portions of said spring, torque transmitting teeth formed integrally in said spring and extending generally longitudinally thereof, and torque transmitting splines carried by one of said rotary members and extending generally longitudinally thereof and adapted to engage between said torque transmitting teeth, said spring being capable of transmitting torque between said rotary members independently of engagement between said splines and said teeth.

17. In a flexible coupling for transmitting torque between two substantially aligned rotary members, the combination of helical spring means extending substantially axially of said rotary members, longitudinally spaced anchoring means for securing said spring means to both of said rotary members, teeth associated with said helical spring means and extending longitudinally thereof between said anchoring means, and splines associated with one of said rotary members and engaging said teeth between said anchoring means.

LON SLOAN.